United States Patent [19]

Brunner et al.

[11] 4,215,405

[45] Jul. 29, 1980

[54] METHOD AND APPARATUS FOR SECURING THE INTERMEDIATE TIME DURATIONS IN STREET TRAFFIC SIGNAL SYSTEMS

[75] Inventors: Heinrich Brunner, Rottach-Egern; Karin Fischer, Munich, both of Fed. Rep. of Germany

[73] Assignee: Siemens Aktiengesellschaft, Berlin & Munich, Fed. Rep. of Germany

[21] Appl. No.: 938,409

[22] Filed: Aug. 31, 1978

[30] Foreign Application Priority Data

Sep. 2, 1977 [DE] Fed. Rep. of Germany ....... 2739616

[51] Int. Cl.² ........................ G06F 15/48; G08G 1/07

[52] U.S. Cl. ...................................... 364/436; 340/37; 340/41 R; 340/43

[58] Field of Search ............... 364/436; 340/37, 41 R, 340/43

[56] References Cited

U.S. PATENT DOCUMENTS 3,274,547 9/1966 Bolton .............................. 364/436 X 3,916,374 10/1975 Drebinger et al. .............. 364/436 X

*Primary Examiner*—Jerry Smith

*Attorney, Agent, or Firm*—Hill, Van Santen, Steadman, Chiara & Simpson

[57] ABSTRACT

A method and apparatus for securing the intermediate protective time periods at an intersection in a street traffic signal system to provide adequate safety protection between respective traffic flows, in which, following the end of the duration of the green light time period of individual signal of the respective traffic flows to be independently controlled, the time elapsing thereafter, representing an actual time value, is totaled and compared with predetermined theoretical protective time values for traffic flows antagonistic to the green light signal to be connected, and upon attaining and/or exceeding the predetermined values, an associated connect command to said last-mentioned green light signal is released, and adding, at intervals somewhat smaller than those corresponding to the time rhythm of the traffic signal, all of said theoretical time values, thus forming an additional actual total time value, which is compared with a theoretical total time value therefor, and in the event an error is ascertained by said comparing operations, effecting corresponding safety precautions.

3 Claims, 6 Drawing Figures

| | 1 | 2 | 3 | 4 | 11 | 12 | 13 | 14 | gn-ed | |
|---|---|---|---|---|---|---|---|---|---|---|
| 1 | – | 7 | – | 7 | – | 12 | – | 12 | | = 38 |
| 2 | 10 | – | 10 | – | 15 | – | 15 | – | | = 50 |
| 3 | – | 7 | – | 7 | – | 12 | – | 12 | | = 38 |
| 4 | 10 | – | 10 | – | 15 | – | 15 | – | | = 50 |
| 11 | – | 10 | – | 10 | – | O | – | O | | = 20 |
| 12 | 15 | – | 15 | – | O | – | O | – | | = 30 |
| 13 | – | 10 | – | 10 | – | O | – | O | | = 20 |
| 14 | 15 | – | 15 | – | O | – | O | – | | = 30 |
| rt-ed | | | | | | | | | | 276 |

METHOD AND APPARATUS FOR SECURING THE INTERMEDIATE TIME DURATIONS IN STREET TRAFFIC SIGNAL SYSTEMS

BACKGROUND OF THE INVENTION

The invention relates to a method for securing the intermediate time periods required at an intersection in a street traffic signal system, and to an apparatus for practicing such method. The term "intermediate times" as herein employed is intended to include all protective time periods at a signal-controlled street intersection to prevent the possibility of accidents resulting from the varying geometry of the different crossings and varying speeds of the pedestrians and vehicles.

To this end, at the end of a green light of one flow of traffic, the flows of all traffic antagonistic thereto, irrespective of whether such antagonistic traffic flows relate to vehicular or pedestrian traffic, the following new traffic flow may be released only after all traffic participants of the traffic flow just stopped have cleared the intersection. However, as the prerequisites of such intermediate protective times, namely the geometry of the individual intersections and/or the differential speeds of pedestrian and vehicle flows, do not vary, the intermediate protective periods need be determined only once, after which they shall not be varied either by faulty equipment or by intervention of unauthorized parties.

The invention is directed to the problem of assuring a compliance with both of these requirements, more particularly to immediately indicate any occurring discrepancies in intermediate protective times and, in the event thereof, to introduce corresponding safety measures, and in addition to also make it impossible for authorized maintenance personnel to make any change in the intermediate periods.

This objective is achieved in accordance with the invention in a method which involves the following steps:

(a) Upon the end of the green light period of each individual signal of the respective traffic flows to be controlled independently, the immediately following time period is totalled.

(b) Such "actual values" are then respectively compared with "theoretical values" for the traffic flows antagonistic to the green light signal to be connected, and upon the actual value attaining and/or exceeding the prescribed theoretical time values, the associated command signal to connect such green light signal is released.

(c) All theoretical values are added at intervals somewhat smaller than that corresponding to the time rhythm of the traffic signal system, in effect forming an additional "actual value", which is then compared with a corresponding "theoretical value", and in the event of a discrepancy therebetween, appropriate safety precautions are released.

In an additional improvement of the invention, a block, for example in the form of code words, must be provided to introduce or change the theoretical values for the individual intermediate time periods, and such block must be initially eliminated to ready the system for a change therein.

BRIEF DESCRIPTION OF THE DRAWINGS

In the drawings wherein like reference characters indicate like or corresponding parts.

DETAILED DESCRIPTION OF THE INVENTION

Figure 1:
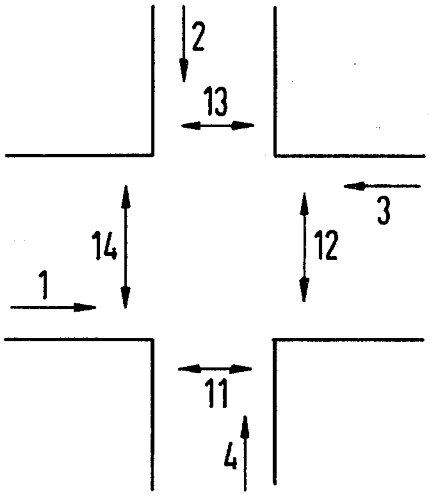
FIG. 1 is a simplified street diagram illustrating an intersection with four approaches and its main traffic flows, both vehicular and pedestrian.
Figure 6:
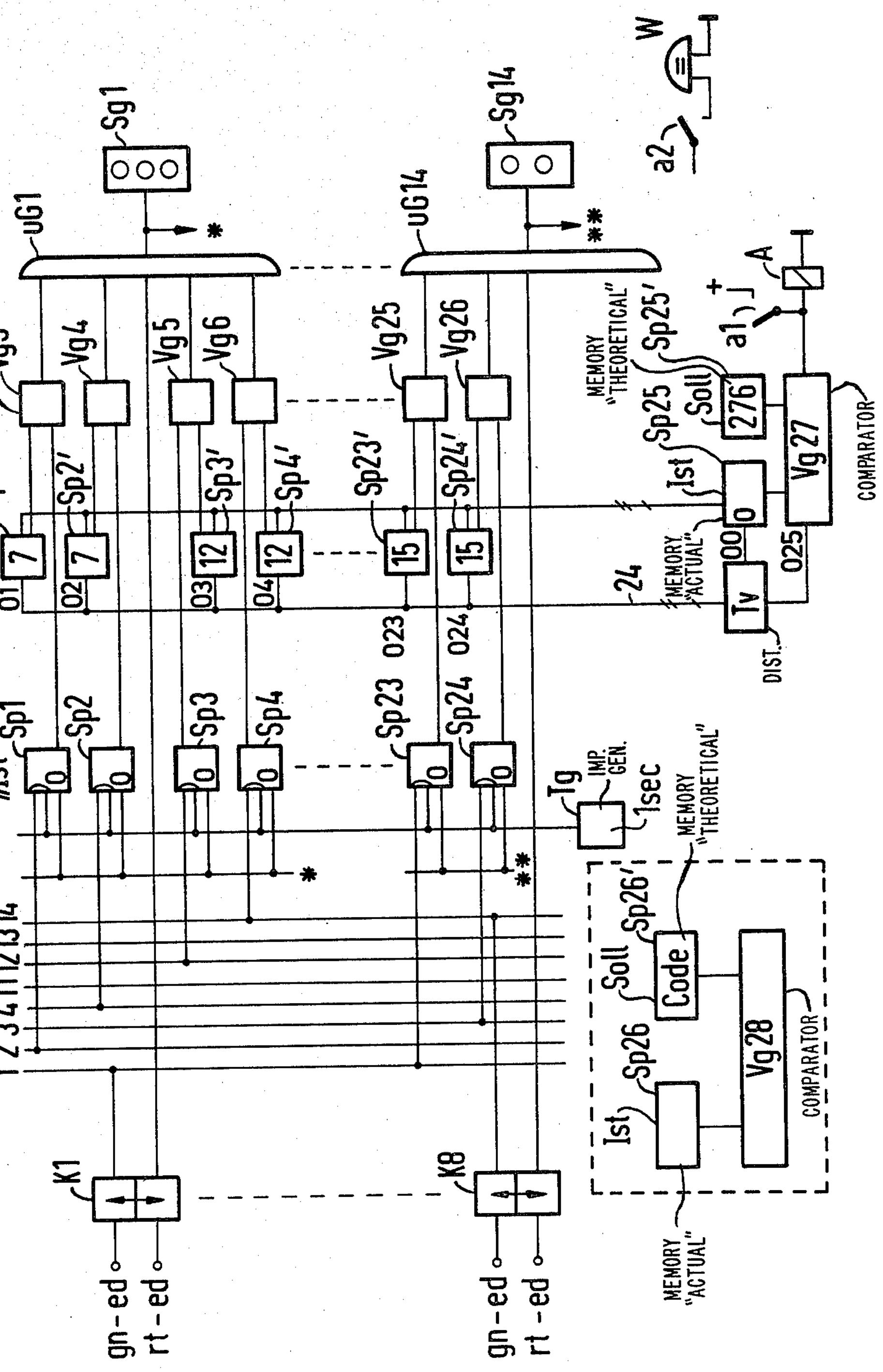

Referring to FIG. 1, the intersection depicted therein involves four approaches into the intersection, having vehicular flows 1 to 4 and pedestrian flows 11 to 14 which are controllable by corresponding signal transmitters Sg1–Sg4 for vehicle traffic and Sg11–Sg–14 for pedestrian traffic, as illustrated only in FIG. 6.

Figure 2:
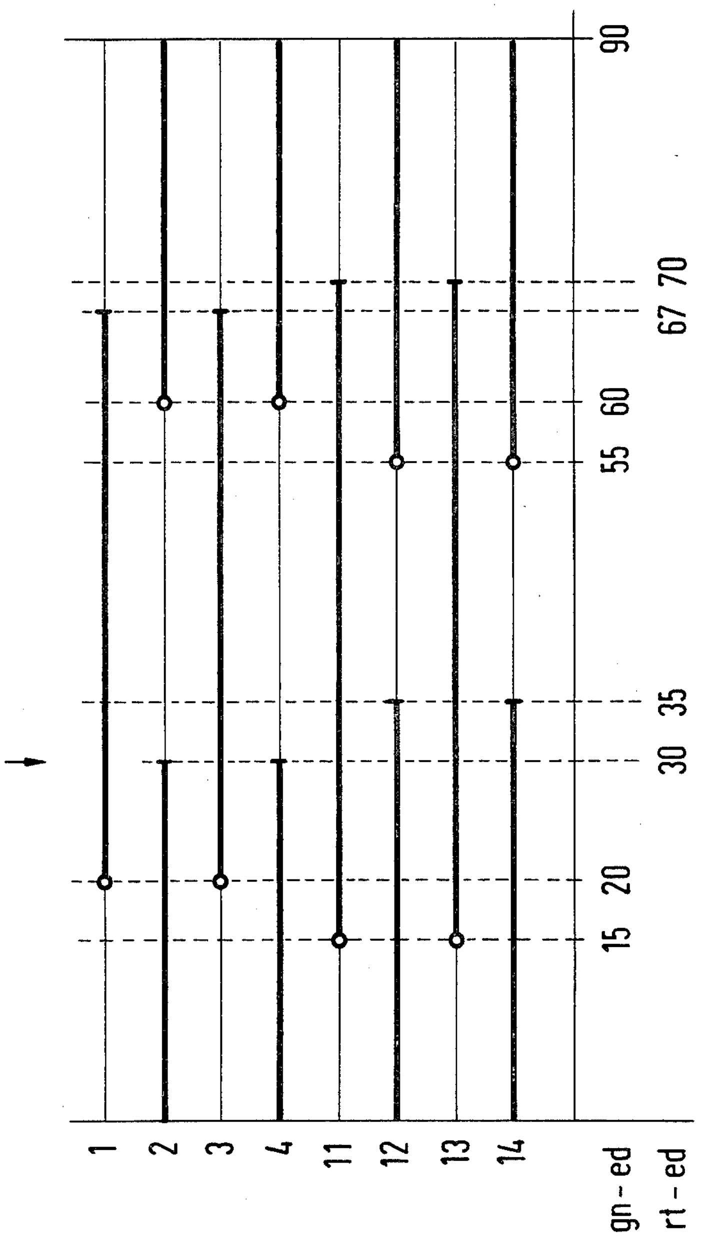
FIG. 2 is a chart illustrating a simplified signal plan of the intersection of FIG. 1.

The signal relationships are correspondingly illustrated graphically in the signal chart of FIG. 2, in which the heavy lines represent red light durations, and the thin lines green light durations. The end or termination of green gn-ed is additionally emphasized by a small circle and the end of the red rt-ed by a serif. Transfer periods of red/yellow and/or yellow are not illustrated as this has no material bearing on the invention.

Figures 3, 4:
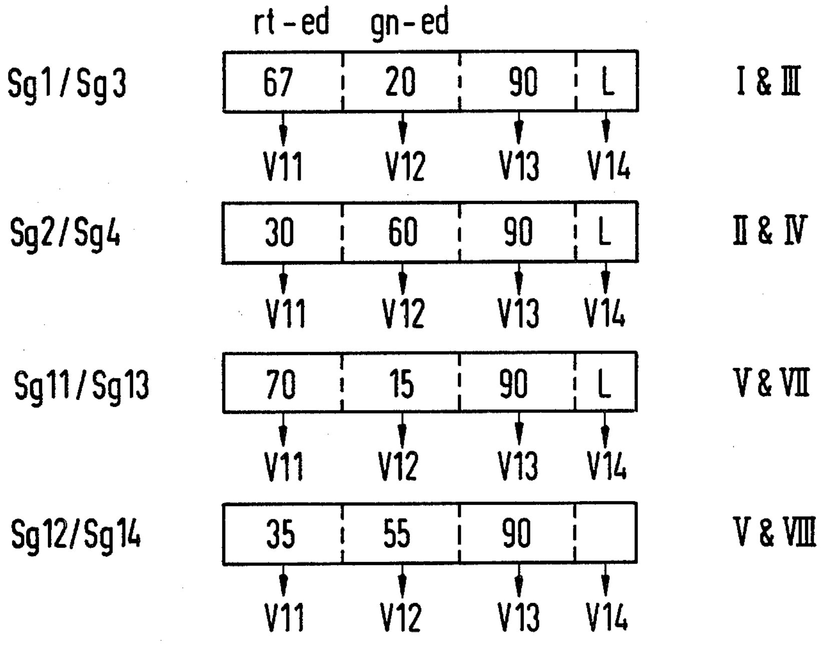
FIG. 3 is a compilation chart of the intermediate protective time periods necessary between respective pairs of traffic flows.
FIG. 4 is a block diagram for a signal plan in a signal system.

The intermediate protective times graphically plotted in FIG. 2 are illustrated in the form of a matrix in FIG. 3 in which the horizontal lines illustrate the traffic flows 1 to 14 for a change from green to red (gn-ed), and the column lines illustrate the traffic flows 1 to 14 for the change from red to green (rt-ed). The intersection point between respective lines and columns thus contains the intermediate protective time associated with each respective condition. In addition, thereto, the last column provides the total of all intermediate times.

Thus the respective signal transmitters Sg1 to Sg14 are to be controllable in accordance with the signal chart of FIG. 2. The data required therefor is entered into respective memory cells I to VIII in accordance with the plan of FIG. 4 and as the start command "L" depicts in the last column of such memory cells, they are directly connected. Thus, over operative connections VII, the switching times 67, 30, 70 and 35 seconds are supplied for the end of red (rt-ed) and over operative connections V12 the switching times 20, 60, 15 and 55 seconds are supplied for the end of green (gn-ed). In addition, the impulse generator Zg2 (FIG. 5), having a cyclic time of 90 seconds, is activated over the operative connections V13.

Figure 5:
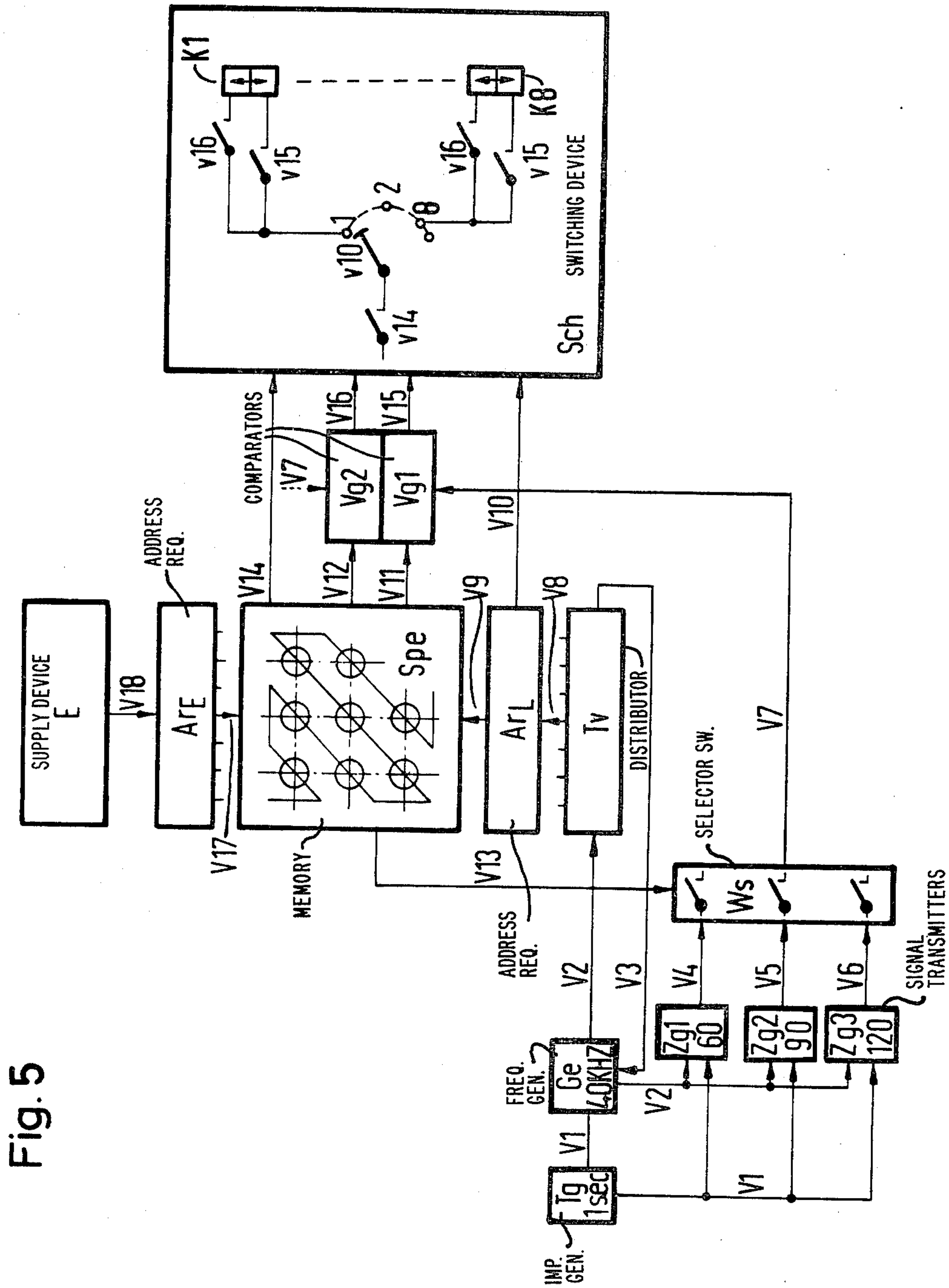
FIGS. 5 and 6, taken together, illustrate a block circuit diagram of a traffice signal system in accordance with the invention.

In the operation of the signal system of FIG. 5, the impulse generator Tg delivers, in accordance with the time interval of the time mosaic, impulses each second over the operative connection VI to the frequency generator Ge for the generation of a 40 kHz signal. The pulses of the latter, over the operative connection V2, consecutively interrogate all memory cells I, II, etc. of the memory system Spe over the distributor Tv, and, following the last distributor step, shuts itself down over the operative connection V3. Simultaneously therewith, the impulse generator Tg and the frequency generator Ge are cooperable with pulse counters, functioning as time signal transmitters Zg1 to Zg3 to provide the periods $u_1=60$ seconds, $u_2=90$ seconds and $u_3$=120 seconds. Each of the latter is connectable through the selector switch WS, actuatable by the memory system Spe over the operative connection V13, to comparators Vg1, Vg2 which follow, the memory system Spe. By means of the address register $Ar_L$, acting as a translator, all memory cells I, II, etc. are interrogated consecutively, which memory cells form a part of the memory system Spe. In addition, simultaneously coordination is established over operative connection V10 between the memory cells I, II, etc. and the individual bistable switches K1 to K8 in the switching device Sch, for the respective signal transmitters Sg1, etc.

If, for example, the memory cell I, represented in FIG. 4, is interrogated by means of the distributor Tv, over the address register $Ar_L$, the time signal transmitter Zg is connected to the comparators Vg1, Vg2 under the control of the selector WS over the operative connection V13.

In the event of identity of time between the time signal transmitter Zg2 and the data contents "67" of the memory cell I, the connect command "L" is supplied over operative connections V11, V15 to the operative connection V14, and to the bistable switch K1, whereby the stop lamp is extinguished (rt-ed).

The switching operations to be effected over the individual operative connections V10, V14 to V16 are symbolically represented in the switching device Sch by the switches v10, v14 to v16. The signal transmitter Sg1 will be suitable actuated by switch K1 to turn the desired stop or move light thereof on or off only after selection by means of the switch v10, illustrated as a rotary switch, and over contacts v14 to v16, only if the associated memory cell emits the turn-on command "L" over the operative connection V14. At the same time, suitable time means can be started during the shifting of the bistable switches K1 etc. whereby, the lamps of the transfer phases (yellow, red-yellow) can be actuated, and only after the duration thereof can the lamps of the principal phases be actuated. It will be appreciated that the operation of transfer phases, per se has no direct bearing on the present invention.

The switches K1, K8, the pulse generator Tg and the distributor Tv are again illustrated in FIG. 6, as they are necessary for the comprehension of the circuit therein illustrated. Moreover, all components of FIG. 6 may be integrated into the circuits illustrated in FIG. 5 and be there realized by corresponding program courses.

If the switch K1 receives the signal gn-ed, the pulse generator can actuate the memory Sp23 each second, over the AND gate provided therein, by one step. This will be apparent from FIG. 6, in which is illustrated a crossbar distribution panel gn-ed having accesses 1 to 14. Thus, at the end of green gn-ed of the traffic flows 1, 4, 12 and 14, the corresponding actual values are stored in the memories Sp1 to S14, for monitoring the intermediate times. These actual values, which in each case are increased by one value each second, are compared in comparators Vg3 to Vg6 with the theoretical values in the memories Sp1' to Sp4'. As long as the theoretical values predominate, no action takes place. However, if the actual values become equal to or greater than the theoretical values, the corresponding comparators Vg3 to Vg6 deliver a "1" signal, and thus after switching the switch K1 to re-ed, it can over the AND gate uG1, turn off the stop light and turn on the move light in the signal transmitter Sg1. It is thereby assured that all intermediate times of the traffic flows 2, 4, 12 and 14 which are antagonistic to the traffic flow 1, have been monitored. As the move light (green) is turned on in the signal transmitter Sg1, all memories Sp1 to Sp4 are simultaneously reset to zero and maintained in this position until further events.

The theoretical values of the intermediate times in the memories Sp1' to Sp24' can be entered into and/or changed only over the supply device E, illustrated in FIG. 5, provided a corresponding code is first supplied to the memory Sp26. The comparator Vg28 compares the theoretical and actual value memories Sp26, Sp26' and only releases the value involved to the theoretical value memories Sp1' to Sp24' in the event of a positive result.

In addition, the distributor TV successively interrogates the theoretical value memories Sp1' to Sp24' with its last steps 01 to 025 in each interrogation cycle, that is at each second, and adds the memory contents in the actual value memory Sp25. This value, i.e. the actual value of the total of all theoretical values, is compared in the comparator Vg27 with the contents, namely "276" of the theoretical value memory Sp25'.

In the event of an erroneous deviation in the comparator Vg27, the latter effects the actuation of a relay A, contacts a1, a2. Such relay is the self-holding type and is adapted to actuate over switching path a2, the alarm device W. All other safety measures which are to be effected following erroneous intermediate times can be released through the alarm switch A, al, a2. With its final step "00" the distributor Tv eventually erases the contents of the actual value switch Sp25 and prepares it for a new interrogation.

All of the switches, memories and comparators described in this installation may, of course, also be integrated into a computer, for example into a micro computer and then by corresponding cycles of such computer the method according to the invention may be practiced.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim as our invention:

1. A method for securing the intermediate protective time periods at an intersection in a street traffic signal system to provide adequate safety protection between respective traffic flows, comprising the following steps:

(a) with the end of the duration of the green light time period of each individual signal of the respective traffic flows to be independently controlled, adding the time elapsing thereafter, representing an actual time value, (b) comparing such actual time value with predetermined theoretical protective time values for traffic flows antagonistic to the green light signal to be connected, and upon attaining and/or exceeding the predetermined values, releasing an associating connect command to said lastmentioned green light signal, (c) adding, at interrogation intervals somewhat smaller than those corresponding to the time rhythm of the traffic signal, all of said theoretical time values employed in (b), with the total thereof thus constituting an additional actual total time value, and comparing the latter with a predetermined theoretical total time value therefor, and in the event an error is ascertained by said comparing operations, effecting corresponding safety precautions.

2. An apparatus for securing the intermediate protective time periods at an intersection in a street traffic signal system to provide adequate safety protection between respective traffic flows, comprising first memory means for storing the actual time elapsing immediately following the end of the duration of the green light time period of each individual signal of the respective traffic flows to be independently controlled, second memory means for storing predetermined theoretical time values for traffic flows antagonistic to the green light signal to be connected, comparator means connected to said memory means for comparing said actual time value with said theoretical time values, means connected to said comparator means for releasing an associated connect command, for effecting the connection of said green light signal to be connected, in the event said actual time value is at least equal to the respective corresponding theoretical time value, means for periodically interrogating said second memory means, a further memory, for receiving all theoretical time values representing the interrogation results, in which such time values are totaled, with such total constituting an actual value, a still further memory for storing a predetermined theoretical total time value, further comparator means connected to said further memories for comparing said actual and theoretical total time values therein, means operatively connected to said comparators for initiating safety precautions in the event the actual values, in either case are less than the theoretical values compared therewith, and timing means for controlling and coordinating the operations of the respective memories and comparators.

3. An apparatus according to claim 2, comprising in further combination, means for the input and/or modification of the theoretical values in said second memory means, an additional actual value memory, and an additional theoretical value memory in which is entered a predetermined code, additional comparator means, connected to said input means, for comparing the contents of said additional actual and theoretical value memories, and for enabling said input means to permit actuation thereof in the event the content entered into said additional actual value memory coincides with the code stored in said additional theoretical value memory.

* * * * *